US012804290B2

(12) United States Patent
Pierce et al.

(10) Patent No.: US 12,804,290 B2
(45) Date of Patent: Nov. 17, 2026

(54) CHARGE-TO-VOLTAGE CONVERSION CIRCUIT WITH INLINE AMPLIFICATION

(71) Applicant: SEMICONDUCTOR COMPONENTS INDUSTRIES, LLC, Scottsdale, AZ (US)

(72) Inventors: Alexander Glenn Pierce, Lebanon, OR (US); Jeffery Beck, Philomath, OR (US)

(73) Assignee: SEMICONDUCTOR COMPONENTS INDUSTRIES, LLC, Scottsdale, AZ (US)

( * ) Notice: Subject to any disclaimer, the term of this patent is extended or adjusted under 35 U.S.C. 154(b) by 215 days.

(21) Appl. No.: 18/532,236

(22) Filed: Dec. 7, 2023

(65) Prior Publication Data

US 2025/0193553 A1 Jun. 12, 2025

(51) Int. Cl.
*H04N 25/78* (2023.01)
*H04N 25/74* (2023.01)
(Continued)

(52) U.S. Cl.
CPC ............. *H04N 25/78* (2023.01); *H04N 25/74* (2023.01); *H04N 25/778* (2023.01); *H04N 25/779* (2023.01)

(58) Field of Classification Search
CPC ...... H04N 25/78; H04N 25/74; H04N 25/778; H04N 25/779
See application file for complete search history.

(56) References Cited

U.S. PATENT DOCUMENTS

2009/0273694 A1* 11/2009 Krymski .............. H04N 25/767 348/308
2016/0265970 A1* 9/2016 Suh ........................... G01J 1/44
(Continued)

FOREIGN PATENT DOCUMENTS

DE 202016102607 U1 6/2016

OTHER PUBLICATIONS

Killat, Dirk. “Sub-1-V CMOS Bandgap using Forward Body Bias of the PMOS Differential Pair for Reduction of the Threshold Voltages.” 2006 8th International Conference on Solid-State and Integrated Circuit Technology Proceedings. IEEE, 2006.
(Continued)

*Primary Examiner* — Nhan T Tran
(74) *Attorney, Agent, or Firm* — Brake Hughes Bellermann LLP

(57) ABSTRACT

An illustrative charge-to-voltage conversion circuit includes a charge detection transistor, a biasing current source, and an inline amplifier stage. The charge detection transistor is powered by a supply voltage and is configured, when activated by a bias current, to produce an output voltage based on a charge received at a gate of the charge detection transistor. The biasing current source is electrically connected to the charge detection transistor and configured to generate the bias current to activate the charge detection transistor. The inline amplifier stage includes an amplifier transistor and is positioned between the charge detection transistor and the biasing current source. The inline amplifier stage is configured to use the bias current generated by the biasing current source to activate the amplifier transistor to amplify the output voltage on an output voltage node of the charge-to-voltage conversion circuit. Corresponding circuits and methods are also disclosed.

20 Claims, 7 Drawing Sheets

(51) Int. Cl.
*H04N 25/778* (2023.01)
*H04N 25/779* (2023.01)

(56) References Cited

U.S. PATENT DOCUMENTS

| | | | | |
|---|---|---|---|---|
| 2018/0103222 | A1* | 4/2018 | Yan | H10F 39/18 |
| 2023/0066061 | A1* | 3/2023 | Nakamoto | H04N 25/78 |

OTHER PUBLICATIONS

Gregoire, B. Robert, and Un-Ku Moon. "An over-60 dB true rail-to-rail performance using correlated level shifting and an opamp with only 30 dB loop gain." IEEE Journal of Solid-State Circuits 43.12 (2008): 2620-2630.

* cited by examiner

CHARGE-TO-VOLTAGE CONVERSION CIRCUIT WITH INLINE AMPLIFICATION

TECHNICAL FIELD

This description relates to charge-to-voltage conversion circuits such as may be used with active pixel sensor (APS) readout schemes and/or with other such applications and use cases.

BACKGROUND

Certain electrical components are configured to detect or produce a charge based on physical phenomena or events. As one example, a photodiode may be used as a light detection element to produce a charge corresponding to an amount of light that the photodiode receives. Based on this function, an array of such light detection elements may be used to capture an image when light from a scene is exposed to the array in a certain way. For example, after being shuttered, focused, and/or otherwise optically manipulated, light detected by an array of photodiodes may result in a large number of charges indicative of luminance values for pixels of an incoming image. In order to generate, store, use, or manipulate this image, the charges generated by each light detection element may be converted to analog voltages and, in some examples, to digital values that can then be digitally stored and processed. Accordingly, charge-to-voltage conversion circuits may be used to input charges and output voltages that are configured for further use in these or other suitable use cases. For example, the output voltages may be suitably amplified for use in analog-to-digital conversion or other downstream processing.

SUMMARY

In one general aspect, a charge-to-voltage conversion circuit may include a first transistor powered by a supply voltage and configured, when activated by a bias current, to produce an output voltage based on a charge received at a gate of the first transistor. The charge-to-voltage conversion circuit may further include a biasing current source electrically connected to the first transistor and configured to generate the bias current to activate the first transistor. The charge-to-voltage conversion circuit may also include an inline amplifier stage that includes a second transistor and that is positioned between the first transistor and the biasing current source. The inline amplifier stage may be configured to use the bias current generated by the biasing current source to activate the second transistor to amplify the output voltage on an output voltage node of the charge-to-voltage conversion circuit. The amplified output voltage on the output voltage node may then be used for any suitable downstream purposes, such as for an input to an analog-to-digital conversion circuit or other load circuit.

In some implementations of the charge-to-voltage conversion circuit, a variety of additional elements and/or features may be employed. As one example, the inline amplifier stage may include a body bias current source electrically connected to the second transistor and configured to draw current from a body of the second transistor. In this way, the body bias current source may reduce a threshold voltage of the second transistor during operation of the inline amplifier stage. As another example, the inline amplifier stage may be configured to amplify the output voltage with a closed-loop gain produced using: a first capacitor electrically connected between a gate of the second transistor and the output voltage node; and a second capacitor electrically connected between the gate of the second transistor and a ground. As another example, the output voltage node may be electrically connected to a load circuit and the inline amplifier stage may include a folded amplifier stage electrically connected to the output voltage node and configured to increase an open-loop gain bandwidth of the amplified output voltage when received by the load circuit. In the case there is such a folded amplifier stage, the folded amplifier stage may be implemented with a cascode circuit including: a voltage bias NMOS transistor electrically connected between the output voltage node and the biasing current source, and two voltage bias PMOS transistors electrically connected between the supply voltage and the output voltage node. As another example, the output voltage node may be electrically connected to a load circuit and the inline amplifier stage may include a correlated level shifting stage electrically connected to the output voltage node and configured to decrease a settling time of the amplified output voltage when received by the load circuit. In the case there is such a correlated level shifting stage, the correlated level shifting stage may include a capacitor that is: electrically connected, during a pre-charge phase, in parallel with the load circuit by being connected between the output voltage node and a ground; and electrically connected, during a level-shift phase, in series with the load circuit by being connected between the output voltage node and the load circuit. Additionally, the correlated level shifting stage may further include: a plurality of switches configured to modify how the capacitor is electrically connected during the pre-charge phase and the level-shift phase; and digital logic configured to control the plurality of switches in accordance with a timing schedule for the pre-charge phase and the level-shift phase.

In another general aspect, an active pixel sensor (APS) readout circuit may utilize similar principles and components as described above to specifically perform charge-to-voltage conversion in the context of an APS readout scheme. For example, the APS readout circuit may include a floating diffusion transistor powered by a supply voltage and configured, when activated by a bias current, to produce an output voltage based on a charge detected by a light detection element associated with a pixel of an array of pixels. The APS readout circuit may further include a biasing current source electrically connected to the floating diffusion transistor and configured to generate the bias current to activate the floating diffusion transistor, as well as a row select transistor configured, when enabled, to connect the output voltage onto a shared pixel readout node associated with a column of the pixel within the array of pixels. An inline amplifier stage may also be included in the APS readout circuit and may be positioned between the floating diffusion transistor and the biasing current source. In this way, the inline amplifier stage can be configured to use the same bias current generated by the biasing current source to activate an amplifier transistor within the inline amplifier stage to amplify the output voltage on an output voltage node of the APS readout circuit. Again, the amplified output voltage on the output voltage node may then be input to an analog-to-digital load circuit or otherwise used in furtherance of an APS image generation objective.

In some implementations of the APS readout circuit, a variety of additional elements and/or features may be employed. As one example, the output voltage node may be electrically connected to a load circuit and the load circuit may include an analog-to-digital converter circuit that is configured to receive the amplified output voltage and to produce, based on the amplified output voltage, a digital value. For example, the digital value may be representative of a luminance of the pixel for an image captured by the array of pixels. As another example, the inline amplifier stage may include a body bias current source electrically connected to the amplifier transistor and configured to draw current from a body of the amplifier transistor. In this way, the body bias current source may reduce a threshold voltage of the amplifier transistor during operation of the inline amplifier stage. As another example, the inline amplifier stage may be configured to amplify the output voltage with a closed-loop gain produced using: a first capacitor electrically connected between a gate of the amplifier transistor and the output voltage node, and a second capacitor electrically connected between the gate of the amplifier transistor and a ground. As another example, the output voltage node may be electrically connected to a load circuit and the inline amplifier stage may include a folded amplifier stage electrically connected to the output voltage node and configured to increase an open-loop gain bandwidth of the amplified output voltage when received by the load circuit. In the case there is a folded amplifier stage, the folded amplifier stage may be implemented with a cascode circuit including: a voltage bias NMOS transistor electrically connected between the output voltage node and the biasing current source; and two voltage bias PMOS transistors electrically connected between the supply voltage and the output voltage node. As another example, the output voltage node may be electrically connected to a load circuit and the inline amplifier stage may include a correlated level shifting stage electrically connected to the output voltage node and configured to decrease a settling time of the amplified output voltage when received by the load circuit. In the case there is a correlated level shifting stage, the correlated level shifting stage may include a capacitor that is: electrically connected, during a pre-charge phase, in parallel with the load circuit by being connected between the output voltage node and a ground; and electrically connected, during a level-shift phase, in series with the load circuit by being connected between the output voltage node and the load circuit. Additionally the correlated level shifting stage may include a plurality of switches configured to modify how the capacitor is electrically connected during the pre-charge phase and the level-shift phase; and digital logic configured to control the plurality of switches in accordance with a timing schedule for the pre-charge phase and the level-shift phase.

In yet another general aspect, a method includes receiving a charge at a floating diffusion transistor that is powered by a supply voltage. The method further includes generating, by a biasing current source electrically connected to the floating diffusion transistor, a bias current. For example, the bias current generated at this step of the method may serve to both: 1) activate the floating diffusion transistor, and 2) activate an amplifier transistor within an inline amplifier stage positioned between the floating diffusion transistor and the biasing current source. The amplifier transistor activated by the bias current may be configured to amplify an output voltage on an output voltage node to a similar effect as described in the other aspects above. The method further includes producing, by the floating diffusion transistor when activated by the bias current, the output voltage based on the charge.

In some implementations of the method, a variety of additional elements and/or features may be employed. As one example, the method may further include drawing current, by a body bias current source electrically connected to the amplifier transistor within the inline amplifier stage, from a body of the amplifier transistor. In this way, the body bias current source may reduce a threshold voltage of the amplifier transistor during operation of the inline amplifier stage. In this case, the inline amplifier stage may amplify the output voltage with a closed-loop gain produced using: a first capacitor electrically connected between a gate of the amplifier transistor and the output voltage node, and a second capacitor electrically connected between the gate of the amplifier transistor and a ground. As another example, the output voltage node may be electrically connected to a load circuit and the method may further include increasing, by a folded amplifier stage electrically connected to the output voltage node within the inline amplifier stage, an open-loop gain bandwidth of the amplified output voltage when received by the load circuit. As another example, the output voltage node may be electrically connected to a load circuit and the method may further include decreasing, by a correlated level shifting stage electrically connected to the output voltage node within the inline amplifier stage, a settling time of the amplified output voltage when received by the load circuit.

The details of these and other implementations are set forth in the accompanying drawings and the description below. Other features will also be apparent from the following description, drawings, and claims.

DETAILED DESCRIPTION

Figure 1:
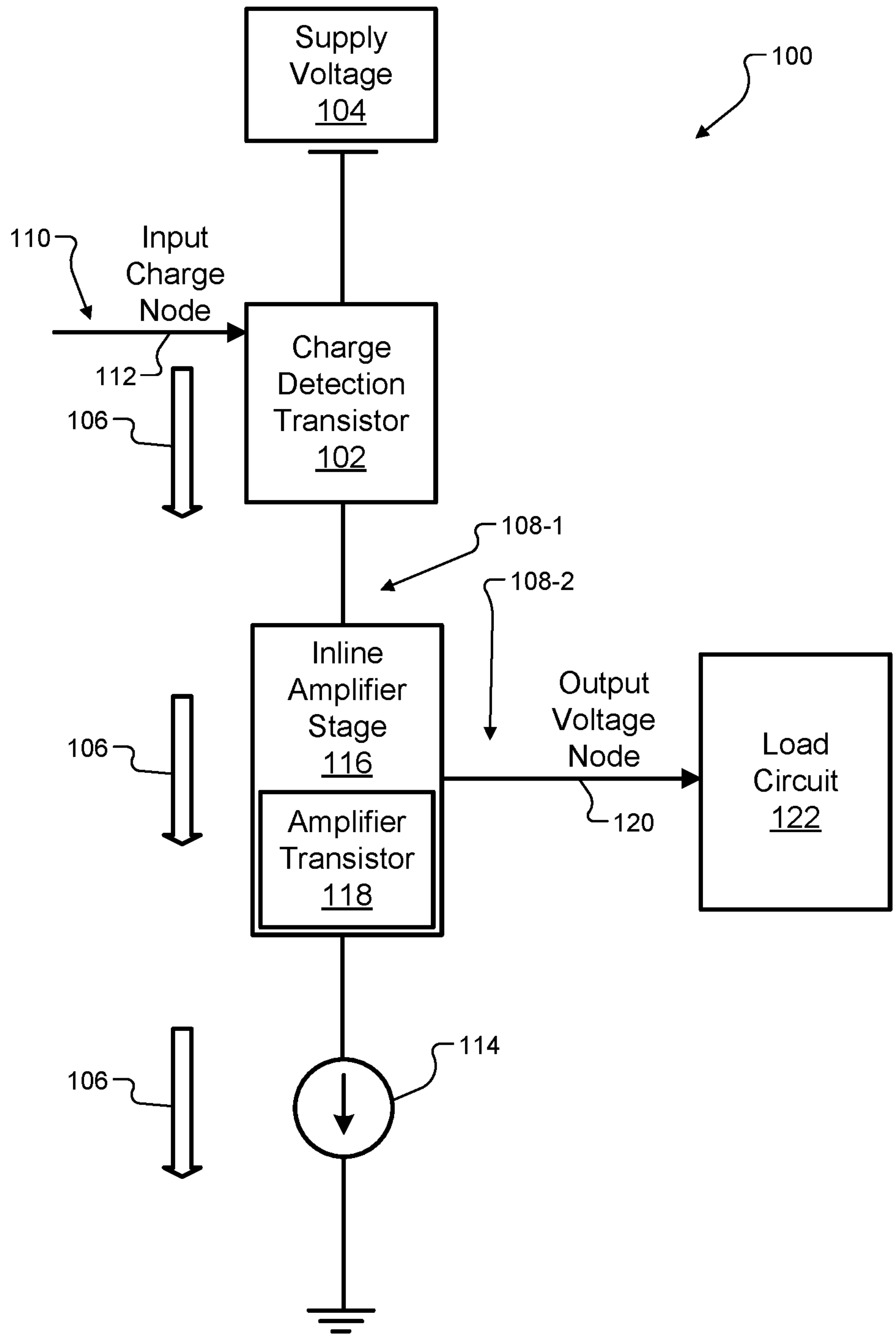
FIG. 1 shows a block diagram of an illustrative charge-to-voltage conversion circuit in accordance with principles described herein.

A charge-to-voltage conversion circuit with inline amplification is described herein. For a variety of applications and use cases, it may be desirable for a charge, such as detected by a photodiode or other such component, to be converted into an amplified voltage that is representative of the charge and can be used for various purposes. For example, as mentioned above, one example use case for a charge-to-voltage conversion circuit may involve light detection components like photodiodes that are employed in image capture circuitry such as may be implemented for active pixel sensing (APS). An array of photodiodes may capture respective charges that are to be read out by being converted to voltages that are suitable for driving downstream loads such as analog-to-digital circuitry. However, at least two challenges may arise in converting an input charge to an output voltage that is configured for use at a downstream load; namely, the challenge of activating a transistor and the challenge of buffering or amplifying an output voltage of the transistor.

First, a transistor at which the charge is received may be activated so as to produce an output voltage based on the charge. For example, if the charge is received at a gate of the transistor, a biasing current source may be configured to pull a bias current through the transistor to thereby activate the transistor so as to produce the output voltage corresponding to the input charge. In some examples, a very low noise (VLN) tail current may be used to properly bias a source follower transistor. For instance, in the example of an APS readout implementation of a charge-to-voltage conversion circuit, a floating diffusion transistor may be electrically connected to a photodiode or other light detection element and a VLN current source may pull the bias current through to activate the transistor and cause the voltage to be produced at the output node of the transistor.

Second, the output voltage produced by the transistor may be buffered or amplified prior to being used at a downstream load. In some examples, the output voltage may be too small to be properly used as an input of a following stage such as an input to an analog-to-digital conversion circuit. For example, the floating diffusion transistor may have a <1 gain that causes a signal from the charge to be attenuated or lost in the charge-to-voltage conversion. Moreover, the output voltage may be too noisy to be used in this way. Regardless, an amplification stage may be included as part of a charge-to-voltage conversion circuit to ensure that a suitably clean and amplified output voltage is presented at an output voltage node of the circuit for delivery to the downstream load circuit.

Addressing both of these challenges generally requires significant power and area usage for the charge-to-voltage conversion circuit. For example, if the charge-to-voltage conversion circuit is included in a silicon chip powered by a power supply, a relatively large amount of area on the silicon may be dedicated to generating both the biasing current source and the follow-on amplification stage, then a relatively large amount of power may be dedicated to operating all of this circuitry. This use of resources may be undesirable, especially for designs with tight power and area budgets and that include large numbers of similar circuits, such as for a large array of pixels.

In contrast to conventional approaches, charge-to-voltage conversion circuits described herein apply inline amplification so as to at least partially combine and reuse the power, area, and other resources associated with addressing these challenges within a single stage of the circuit. Specifically, as will be described and illustrated below, rather than implementing an amplifier stage after the floating diffusion transistor and the biasing (VLN) current source in a way that would require additional power and area, circuits described herein allow this stage to be positioned inline between the floating diffusion transistor and the biasing current source so as to perform the amplification using the same bias current that is already being produced by the biasing current source. Such an approach allows for both of the challenges laid out above to be properly addressed while also saving significantly on power usage, silicon area, and/or other finite resources that might otherwise be put to less efficient use. For example, by using the same bias current to activate both the floating diffusion transistor and an amplifier transistor included in an inline amplifier stage, the amount of power used by the overall charge-to-voltage conversion circuit may be approximately half of what it would be in the conventional setup where these power draws are separated. Additionally, the total area usage for the biasing current source pulling the shared bias current through both of these transistors may utilize only a small fraction of the area that might be used otherwise for a separate, dedicated (non-inline) amplifier stage.

Accordingly, a few benefits that may be created by charge-to-voltage conversion circuit with inline amplification described herein include, but are not limited to: 1) allowing for removal of a dedicated active amplifier stage, thereby drastically lowering the area and power consumption required to amplify an output signal; 2) improving the design of any application requiring the readout and/or amplification of charge related signals such as APS signals; 3) causing charge-to-voltage conversion circuit designs to be lower cost as a result of lower area requirements; and 4) causing charge-to-voltage conversion circuit designs to have decreased power consumption, increased reliability, and improved heat and temperature profiles.

Various implementations will now be described in more detail with reference to the figures. It will be understood that the particular implementations described below are provided as non-limiting examples and may be applied in various situations. Additionally, it will be understood that other implementations not explicitly described herein may also fall within the scope of the claims set forth below. Charge-to-voltage conversion circuits with inline amplification and related methods may result in any or all of the technical benefits mentioned above, as well as various additional technical benefits that will be described and/or made apparent below.

FIG. 1 shows a block diagram of an illustrative charge-to-voltage conversion circuit 100 in accordance with principles described herein. As will be described and set forth below, charge-to-voltage conversion circuits such as circuit 100 may be implemented in a variety of ways and with a variety of optional features that may be used in any combination as may serve a particular implementation. The block diagram of circuit 100 illustrated in FIG. 1 is therefore presented as a high-level representation of certain features that may be common to many or all of the charge-to-voltage conversion circuit implementations described herein, and various additional implementations with different combinations of features will be described and illustrated below.

As shown in FIG. 1, circuit 100 includes a first transistor powered by a supply voltage and configured, when activated by a bias current, to produce an output voltage based on a charge received at a gate of the first transistor. Specifically, a charge detection transistor 102 is shown to be powered by a supply voltage 104. The charge detection transistor 102 is configured to receive a charge 110 at the input charge node 112 of the charge detection transistor 102 (i.e., at the gate of the transistor) and, when activated by a bias current 106, to produce an output voltage 108-1 at its output that is based on the charge 110. Charge detection transistor 102 may correspond to floating diffusion transistors described herein and may be implemented as any suitable type of transistor as may serve a particular implementation. For example, charge detection transistor 102 may be implemented using an N-channel Metal-Oxide Semiconductor (NMOS) transistor in an example employing Complementary Metal-Oxide Semiconductor (CMOS) technology.

As further shown in FIG. 1, circuit 100 may include a biasing current source electrically connected to the first transistor and configured to generate the bias current to activate the first transistor. Specifically, a biasing current source 114 that is electrically connected to charge detection transistor 102 (though separated by other circuitry and not directly coupled) is shown to generate the bias current 106 that activates charge detection transistor 102. To illustrate, several instances of bias current 106 (represented by arrows next to various circuit component blocks in the diagram) indicate that the same bias current 106 produced by biasing current source 114 is also pulled through charge detection transistor 102 and other parts of the circuit in the ways described herein. As mentioned above, biasing current source 114 may be configured to generate a very low noise (VLN) current that meets certain requirements for the particular application, such as noise requirements that ensure the charge of each pixel is detected accurately. To this end, biasing current source 114 may be implemented in any suitable way, such as by one or more additional transistors. For instance, one or more additional NMOS transistors may implement biasing current source 114 in the example where a CMOS technology is used to produce the circuit.

As further shown in FIG. 1, circuit 100 may also include an inline amplifier stage positioned between the first transistor and the biasing current source. The inline amplifier stage may be configured to use the bias current generated by the biasing current source to activate a second transistor within the inline amplifier stage to amplify the output voltage on an output voltage node of the charge-to-voltage conversion circuit. Specifically, an inline amplifier stage 116 is shown to be positioned between charge detection transistor 102 and biasing current source 114 in FIG. 1. This inline amplifier stage 116 uses the same bias current 106 generated by biasing current source 114 to activate an amplifier transistor 118 within inline amplifier stage 116 to amplify output voltage 108-1 on an output voltage node 120 of circuit 100. In other words, as shown, an amplified output voltage 108-2 based on output voltage 108-1 is present on output voltage node 120 to go to a load circuit 122 that follows circuit 100. The load circuit 122 may be considered as being separate from circuit 100 (a following stage after circuit 100). For example, after a gain is applied to output voltage 108-1 and this voltage is cleaned up and/or otherwise amplified by inline amplifier stage 116, the amplified output voltage 108-2 is presented at output voltage node 120 for use by load circuit 122. Inline amplifier stage 116 may be implemented in a variety of ways and may include a variety of features in various implementations, several of which will be described and illustrated in more detail below.

Figure 2:
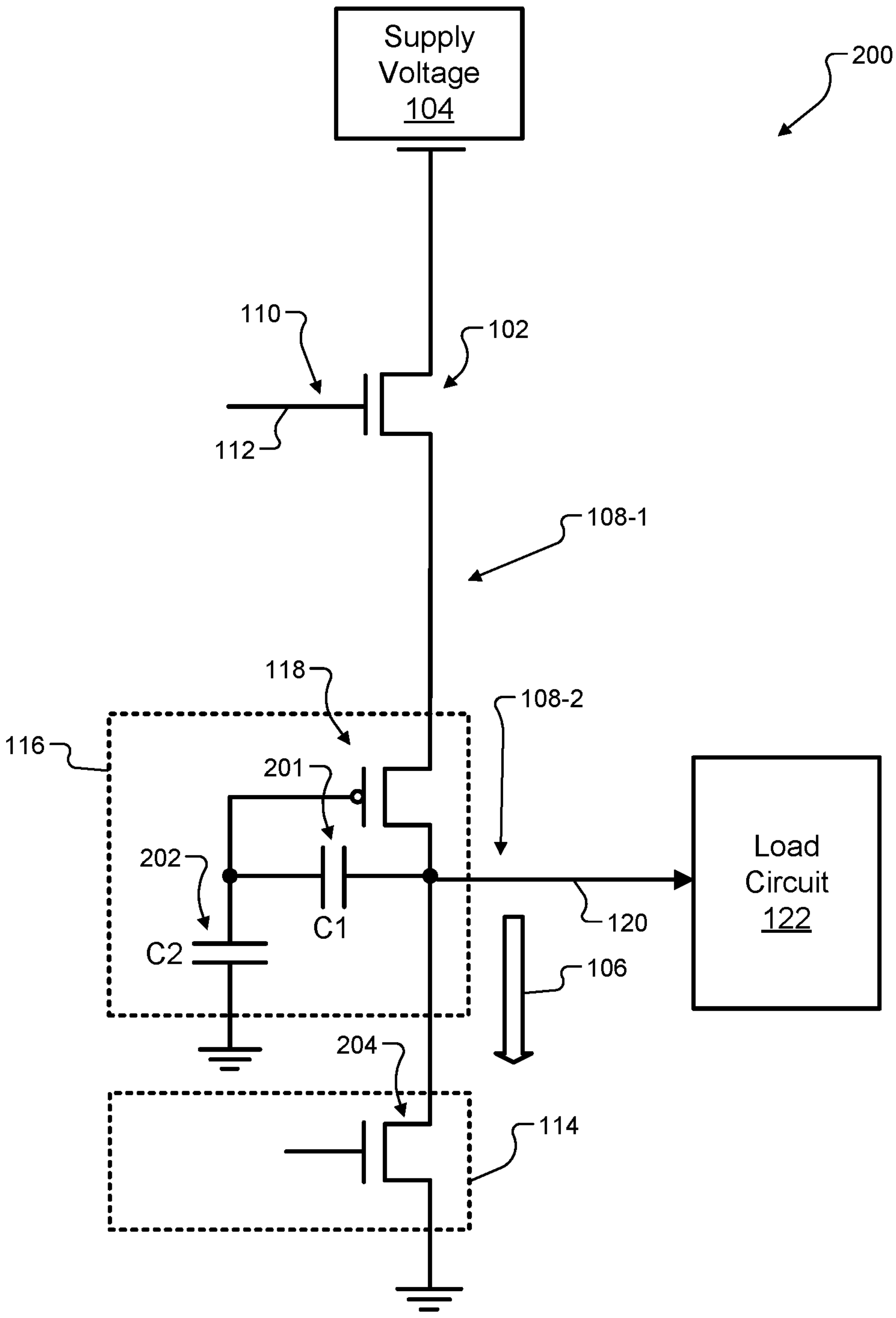
FIG. 2 shows an example implementation of certain aspects of a charge-to-voltage conversion circuit in accordance with principles described herein.

FIG. 2 shows an example implementation 200 of charge-to-voltage conversion circuit 100. Various reference numbers set forth and described above in relation to FIG. 1 (reference numbers in the 100s) are still included in FIG. 2 to indicate how certain aspects of implementation 200 may be implemented in this example. Additionally, new reference numbers (in the 200s) are used in FIG. 2 to point out distinct features of implementation 200 that have not yet been described. A similar notation scheme will also be used in other figures described below.

In implementation 200, charge detection transistor 102 is drawn as a transistor powered by supply voltage 104 and having the input charge node 112 connected at the gate of the transistor. With charge 110 at input charge node 112 of charge detection transistor 102, output voltage 108-1 is shown to emerge from the drain (or output) as long as bias current 106 is being pulled through charge detection transistor 102 by biasing current source 114. Biasing current source 114 is shown in FIG. 2 to be implemented by another transistor 204 that pulls bias current 106 not only through charge detection transistor 102 but also through amplifier transistor 118 of inline amplifier stage 116. Transistor 118 is shown in this implementation as a PMOS transistor.

The inline amplifier stage 116 may also include additional components, such as one or more capacitors, to amplify voltage. As shown in FIG. 2, implementation 200 also shows that a capacitor 201 (labeled C1) and a capacitor 202 (labeled C2) are included with the amplifier transistor 118 in inline amplifier stage 116. For example, inline amplifier stage 116 may use these capacitors to amplify output voltage 108-1 with a closed-loop gain to generate the amplified output voltage 108-2 that is presented at output voltage node 120 to load circuit 122, as described above.

The closed-loop gain produced by inline amplifier stage 116 may use both 1) a first capacitor electrically connected between a gate of the second transistor and the output voltage node; and 2) a second capacitor electrically connected between the gate of the second transistor and a ground. This is illustrated in implementation 200 by capacitor 201 being electrically connected between a gate of amplifier transistor 118 and output voltage node 120, and by capacitor 202 being electrically connected between the gate of amplifier transistor 118 and ground. The closed-loop gain applied by inline amplifier stage 116 to output voltage 108-1 to generate amplified output voltage 108-2 may be a fixed, closed-loop gain governed by the values of capacitors 201 and 202. For example, referring to capacitor 201 as C1 and capacitor 202 as C2, the fixed gain applied by the circuit shown in implementation 200 may be computed as 1+C2/C1. Since amplifier transistor 118 is a PMOS transistor in this example, no inversion of the signal may be associated with this gain. Additionally, since inline amplifier stage 116 uses the same bias current 106 being generated by biasing current source 114 to activate charge detection transistor 102, no additional current is required to amplify the signal and produce this closed-loop gain.

Capacitors 201 and 202 may be selected so as to create a desired gain (based on the 1+C2/C1 equation mentioned above) for inline amplifier stage 116 while also meeting various criteria or balancing various tradeoffs as may be relevant in a particular situation. For example, if a gain of 4 is desired, capacitor 201 (C1) may be selected to have a first capacitance value and capacitor 202 (C2) may be selected to have a second capacitance value three times greater than the first capacitance value. Another consideration in selecting capacitors 201 and 202 is that it may be desirable to choose small capacitance values to conserve area and reduce charge times and so forth. At the same time, a balance may be struck in also selecting capacitance values large enough to minimize parasitic capacitance effects of amplifier transistor 118, to ensure that thermal noise on the capacitors can be ignored or properly accounted for, and so forth.

Figure 3:
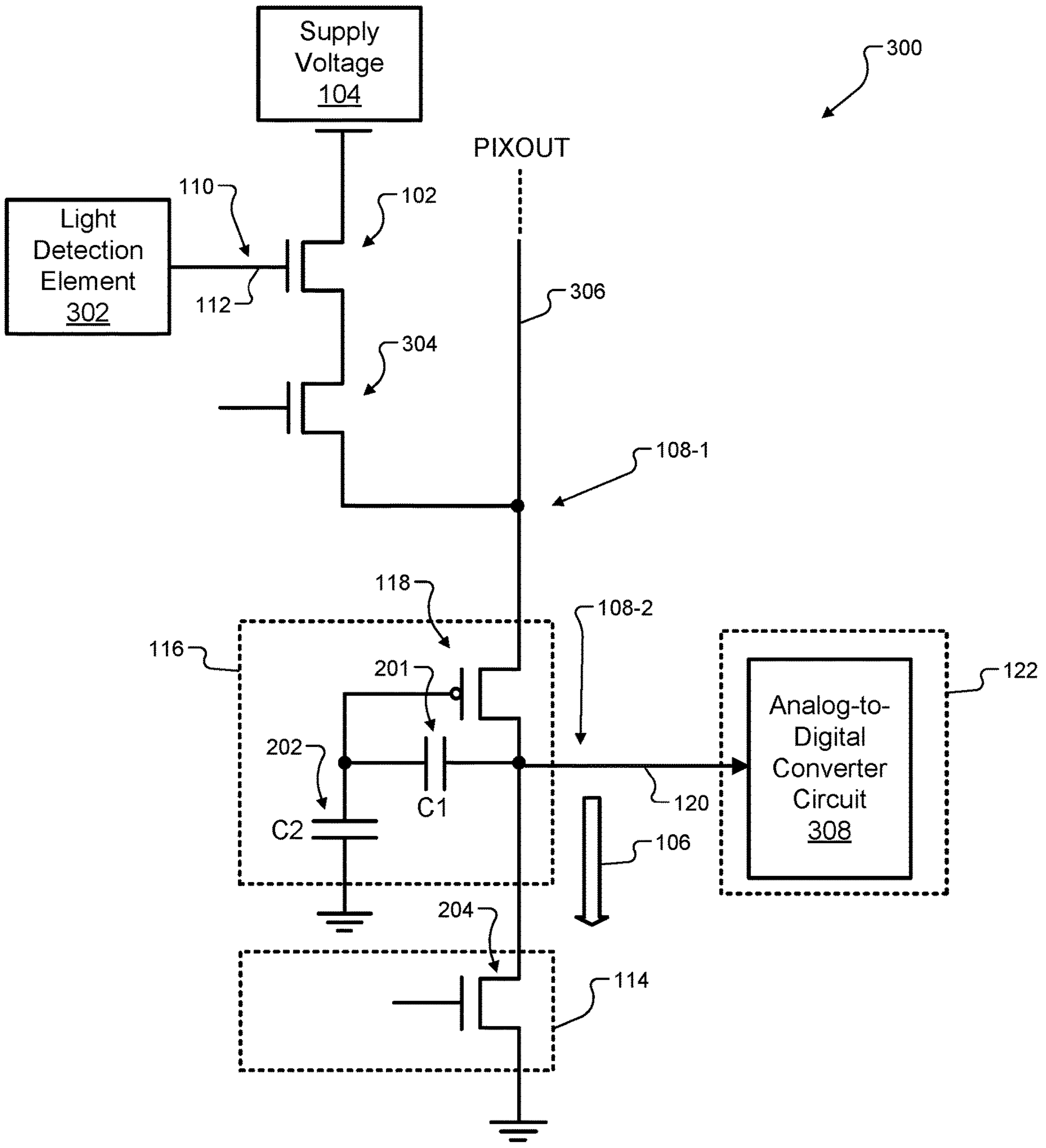
FIG. 3 shows an example active pixel sensor (APS) readout circuit implementation of a charge-to-voltage conversion circuit in accordance with principles described herein.

FIG. 3 shows an example implementation 300 of charge-to-voltage conversion circuit 100. More particularly, implementation 300 is an active pixel sensor (APS) readout circuit implementation of the charge-to-voltage conversion circuit that may be used to capture images in an image capture device. As such, implementation 300 may also be referred as an APS readout circuit 300. As with implementation 200 in FIG. 2, it will be understood that various reference numbers set forth and described above (reference numbers in the 100s and 200s) are still included in FIG. 3. Additionally, new reference numbers (in the 300s) are used in FIG. 3 to point out distinct features of implementation 300 that have not yet been described.

As shown in FIG. 3, APS readout circuit 300 may include a floating diffusion transistor powered by a supply voltage and configured, when activated by a bias current, to produce an output voltage based on a charge detected by a light detection element associated with a pixel of an array of pixels; a biasing current source electrically connected to the floating diffusion transistor and configured to generate the bias current to activate the floating diffusion transistor; a row select transistor configured, when enabled, to connect the output voltage onto a shared pixel readout node associated with a column of the pixel within the array of pixels; and an inline amplifier stage positioned between the floating diffusion transistor and the biasing current source, the inline amplifier stage being configured to use the bias current generated by the biasing current source to activate an amplifier transistor within the inline amplifier stage to amplify the output voltage on an output voltage node of the APS readout circuit.

More particularly, the floating diffusion transistor of implementation 300 will be understood to be charge detection transistor 102, which is powered by supply voltage 104 and configured, when activated by bias current 106, to produce output voltage 108-1 based on charge 110 at input charge node 112 in a similar manner as described above for other implementations. In this example, charge 110 is shown to be generated by a light detection element 302 that is connected at input charge node 112 (the gate of the floating diffusion transistor). The light detection element 302 may be part of a pixel in an array of pixels. For example, light detection element 302 may be implemented as a photodiode of an array of photodiodes that represent the various pixels and collectively detect photos at various frequencies to thereby produce charge corresponding to the light energy being captured. While only one light detection element 302 is shown for this one implementation of circuit 100, it will be understood that a large number of light detection elements may each be associated with their own floating diffusion transistors and/or other elements of circuit 100 (implementation 300) on a APS chip configured to capture images.

Similar to implementation 200, implementation 300 shows that biasing current source 114 is implemented by transistor 204, which is electrically connected to the floating diffusion transistor (charge detection transistor 102) and configured to generate bias current 106 to activate the floating diffusion transistor. Additionally, and in contrast with implementation 200, implementation 300 shows a row select transistor 304 that is configured, when enabled, to connect the output voltage from the floating diffusion transistor onto a shared pixel readout node 306 (labeled "PIX-OUT"). For example, a row select signal (not explicitly shown) may be presented at a gate of row select transistor 304 and, when the signal is active (so as to select the particular row associated with this pixel), row select transistor 304 may connect the output of charge detection transistor 102 (the floating diffusion transistor) to shared pixel readout node 306 such that the output voltage 108-1 is presented at the shared pixel readout node 306, as shown. In this APS readout circuit example, shared pixel readout node 306 may be associated with a particular column of pixels within the array of pixels. Specifically, for example, shared pixel readout node 306 may be associated with the particular column on which the pixel of light detection element 302 is included. Additional similar circuits may also be electrically connected to this node as well so that they may all share biasing current source 114, inline amplifier stage 116, and so forth. In this way, the row select mechanism may serve as a multiplexer for potentially thousands of charges detected for a given column by potentially thousands of light detection elements.

As with implementation 200, implementation 300 shows that inline amplifier stage 116 may be positioned between the floating diffusion transistor and biasing current source 114. As has been described, inline amplifier stage 116 may be configured to use the bias current 106 generated by biasing current source 114 to activate amplifier transistor 118 within inline amplifier stage 116 to amplify output voltage 108-1 as amplified output voltage 108-2 on output voltage node 120 of the APS readout circuit. Specifically, as shown and as has been described, amplifier transistor 118 may produce a gain, dictated by capacitors 201 and 202, that allows amplified output voltage 108-2 to be presented at output voltage node 120, which is electrically connected to load circuit 122.

In this APS readout circuit implementation, FIG. 3 shows that this load circuit 122 may include or be implemented by an analog-to-digital converter circuit 308. For example, analog-to-digital converter circuit 308 may receive amplified output voltage 108-2 on output voltage node 120 as an input and may be configured to produce, based on amplified output voltage 108-2, a digital value representative of a luminance of the pixel for an image captured by the array of pixels. For example, if amplified output voltage 108-2 is a relatively large voltage (signifying that the light illuminating the pixel was detected to be relatively bright), analog-to-digital converter circuit 308 may generate a relatively large digital value accordingly. Similarly, if amplified output voltage 108-2 is a relatively small voltage (signifying that the light illuminating the pixel was detected to be relatively dim), analog-to-digital converter circuit 308 may generate a relatively small digital value accordingly. From analog-to-digital converter circuit 308, the digital value may be stored, processed, presented, or otherwise manipulated or used in any suitable way that image data is used.

Circuitry for efficiently activating a charge detection transistor using a same bias current that is also used to amplify an output voltage of that transistor has been described and illustrated. Various benefits that may arise from using the same bias current for these two objectives, as well as tradeoffs that may be balanced in order to effect those benefits, have also been described. For example, the overall power usage and silicon area required by inline amplifier stages described herein may be significantly reduced as compared to conventional amplifier stages that follow charge-to-voltage conversion circuits and draw their own amplification current rather than reusing the bias current inline. Tied to these benefits, however, may be a variety of challenges such as headroom (threshold voltage) challenges, open-loop gain (settling accuracy) challenges, and settling time challenges.

Using additional circuitry that will now be described, these challenges may be addressed in various ways to mitigate or entirely eliminate the drawbacks and thereby provide the benefits of the inline amplification without undesirable side effects. Specifically, FIG. 4 shows certain features that may be included to address challenges related to headroom of an inline amplifier stage, FIG. 5 shows certain features that may be included to address challenges related to settling accuracy or open-loop gain bandwidth of the inline amplifier stage, and FIG. 6 shows certain features that may be included to address challenges related to settling time of the inline amplifier stage.

Figure 4:
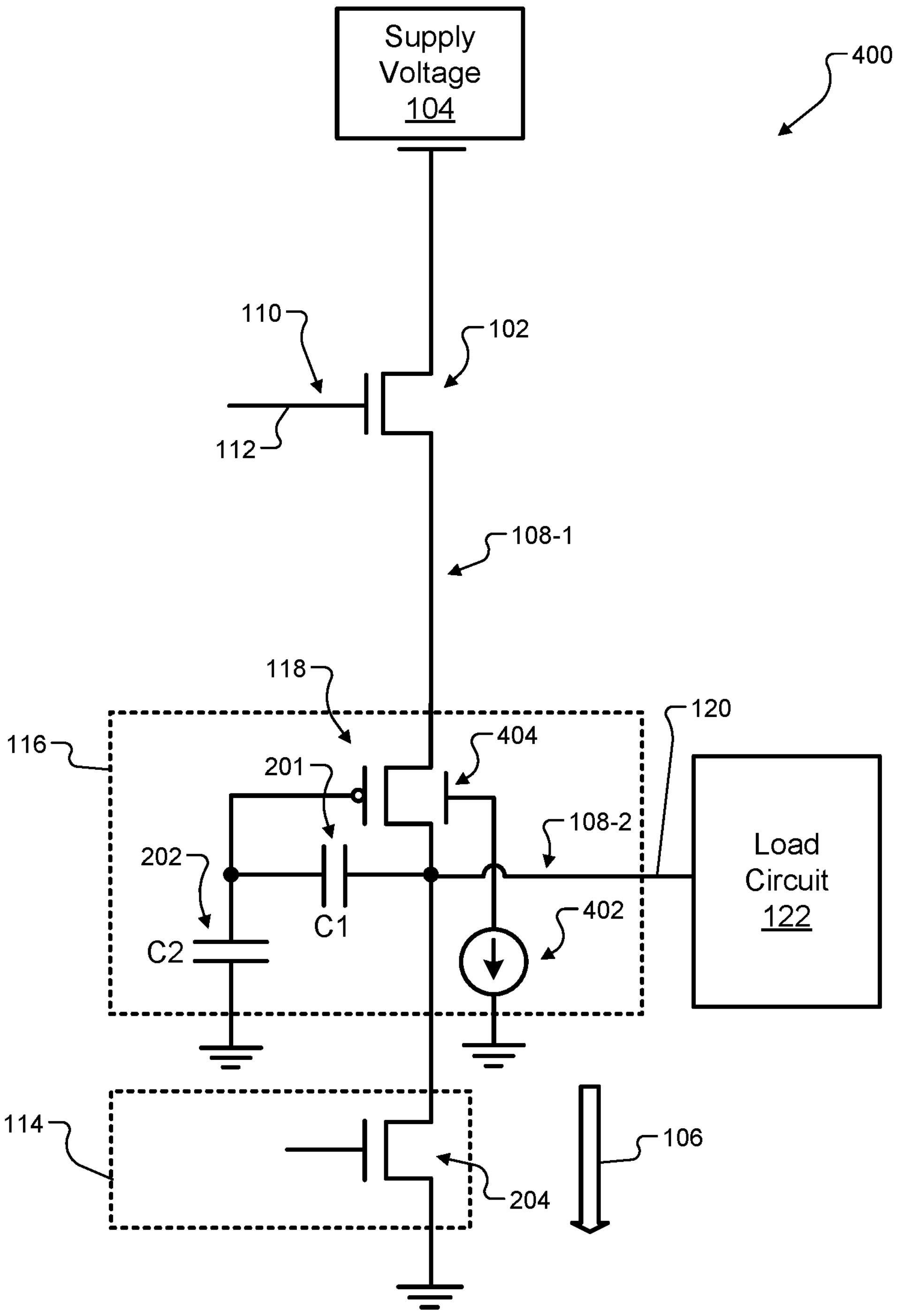
FIG. 4 shows certain features that may be included in an inline amplifier stage of a charge-to-voltage conversion circuit in accordance with principles described herein.
Figure 5:
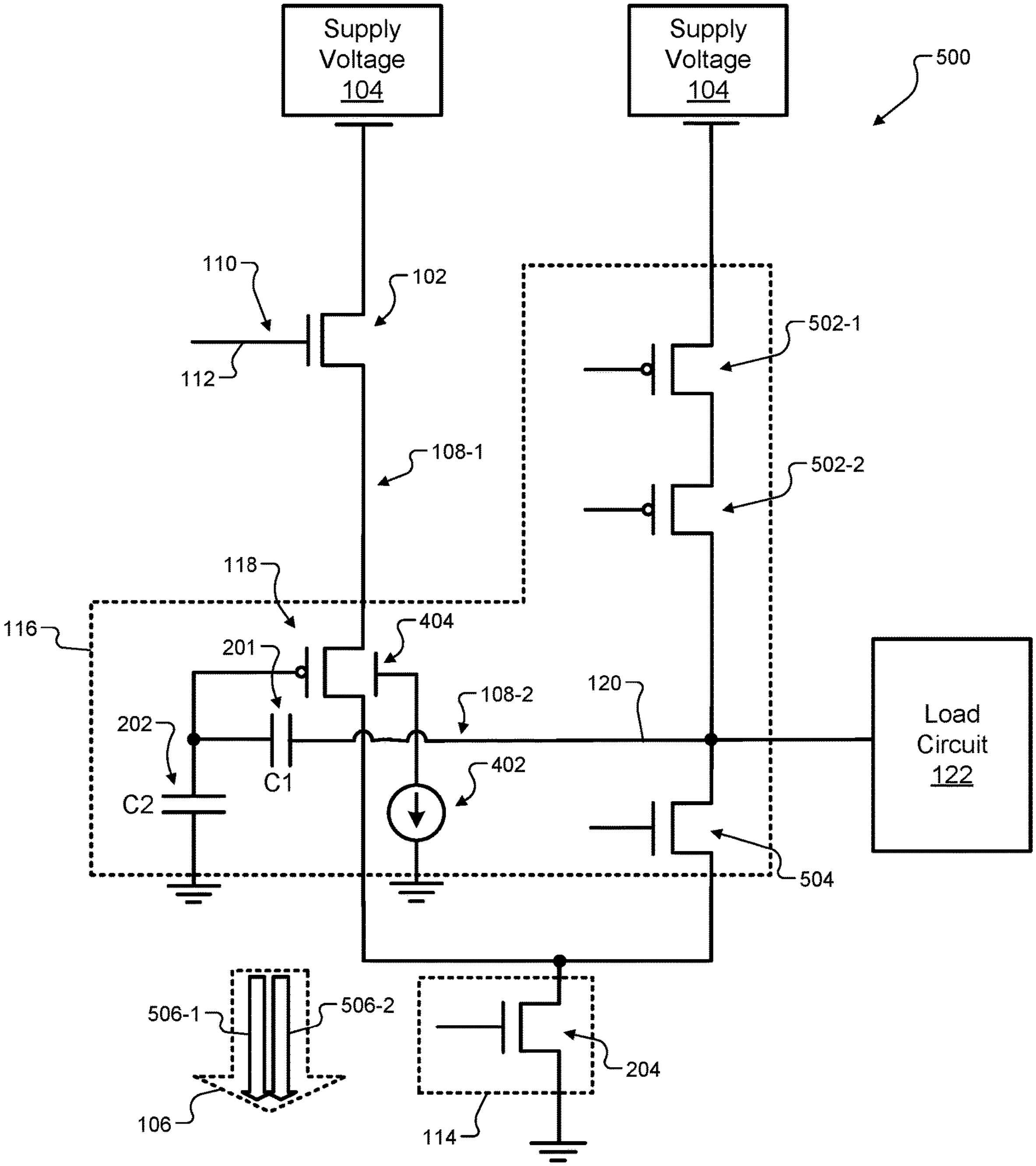
FIG. 5 shows additional features that may be included in an inline amplifier stage of a charge-to-voltage conversion circuit in accordance with principles described herein.
Figure 6:
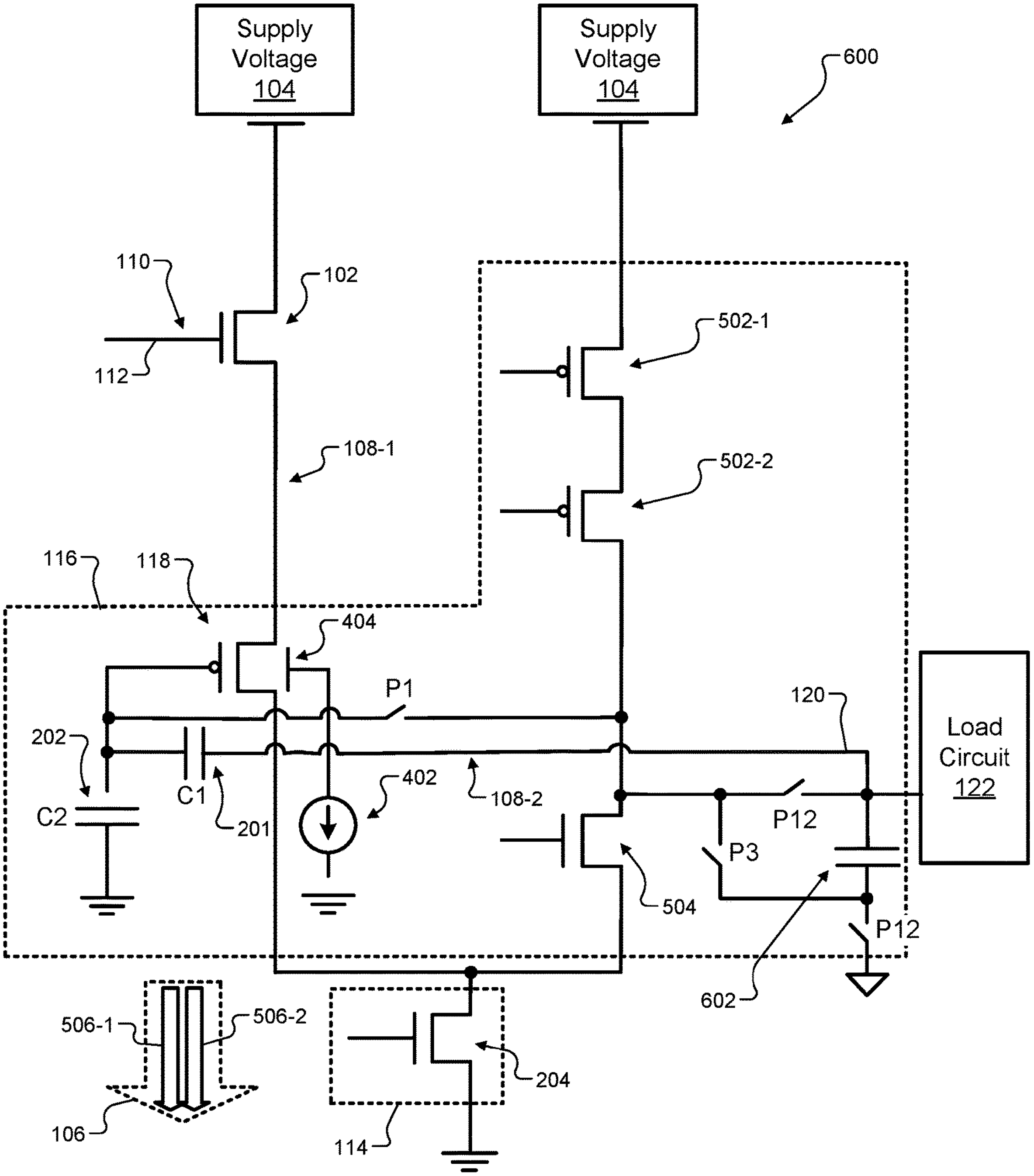
FIG. 6 shows additional features that may be included in an inline amplifier stage of a charge-to-voltage conversion circuit in accordance with principles described herein.

It is noted that the features illustrated in FIGS. 4-6 may be optional features and may be applied in any combination to implementations of charge-to-voltage conversion circuits described herein. Such design choices may be made in accordance with the context and needs of a particular implementation and the application or use case for which it is intended. For example, for an application or use case in which the charge-to-voltage conversion circuit is used as an APS readout circuit for an image capture chip that captures images at a relatively high frame rate, it may be especially important to address settling time challenges. For a power-sensitive application or use case in which the supply voltage is relatively low (leaving little headroom margin), it may be especially important to address threshold voltage challenges. For a high-stakes application or use case in which accuracy is highly valued such as in automotive automation applications in which important real-time decisions are made based on captured images, it may be especially important to address settling accuracy challenges. For applications or use cases in which none of these are of particular concern but other drivers such as cost are of greater import, none of these additional features may be included in an implementation of circuit 100. On the other hand, other applications or use cases may call for all of these features, or a specific combination thereof, to be included in an implementation of circuit 100.

FIG. 4 shows an example implementation 400 of charge-to-voltage conversion circuit 100. As with implementation 200 described above, implementation 400 includes the charge detection transistor 102 that is powered by the supply voltage 104 and is configured, when activated by the bias current 106, to produce the output voltage 108-1 based on charge 110 received at the input charge node 112 connected to the gate of the transistor. Implementation 400 further shows the biasing current source 114 implemented by transistor 204 and electrically connected to the charge detection transistor 102 so as to generate bias current 106 to activate the charge detection transistor 102. The inline amplifier stage 116 is again positioned inline between charge detection transistor 102 and transistor 204 so as to use bias current 106 to activate the amplifier transistor 118 within the inline amplifier stage and to thereby amplify output voltage 108-1 on an output voltage node 120. That is, a gain selected by capacitors 201 and 202 causes amplifier transistor 118 to produce amplified output voltage 108-2 on output voltage node 120, which is then presented to load circuit 122.

In addition to these circuit features, which are described in detail above, implementation 400 further shows additional features within inline amplifier stage 116 that have not yet been described. Specifically, in this example, inline amplifier stage 116 is shown to include a body bias current source 402 that is electrically connected to amplifier transistor 118 and configured to draw current from a body 404 of amplifier transistor 118 to thereby reduce a threshold voltage of amplifier transistor 118 during operation of inline amplifier stage 116. This feature may help address headroom challenges that may arise due to the voltage level of supply voltage 104 and the number of stacked transistor devices between supply voltage 104 and ground. Specifically, if supply voltage 104 is a relatively low voltage, as may be desirable for various reasons, each transistor device within the charge-to-voltage conversion circuit may drop the voltage by a threshold voltage in order to remain in a suitable region of operation as the circuit is in use. While positioning inline amplifier stage 116 in between biasing current source 114 and charge detection transistor 102 leads to various benefits that have been described, this position may put more stress on headroom budgets since another threshold drop is added to the circuit between supply voltage 104 and ground. By pulling a body bias current through body 404 of amplifier transistor 118, current source 402 decreases the threshold voltage of amplifier transistor 118 and helps ensure that amplifier transistor 118 remains functional and in a desired operational state even with a constrained headroom budget.

The amount of current pulled by current source 402 need not be a large current. For example, it may be sufficient for current source 402 to be a small current source that pulls a body bias current on the order of picoamps. But by helping bias the body of the semiconductor of amplifier transistor 118, the threshold voltage of the transistor device may be lowered to ensure proper operation across anticipated temperature and process corners and even with narrow headroom that could otherwise lead to undesirable behavior. The body terminal (body 404) of amplifier transistor 118 from which the body bias current is drawn may be an N-well of the transistor in an example where amplifier transistor 118 is implemented as a PMOS transistor.

FIG. 5 shows an example implementation 500 of charge-to-voltage conversion circuit 100. Implementation 500 continues to build on implementation 400, though, as mentioned above, it will be understood that the added features of implementation 500 serve an independent function from those added in implementation 400 and could be implemented separately from the features of implementation 400 in certain implementations. In this particular example, implementation 500 is shown to include all the features of implementation 400, including current source 402 drawing a body bias current from body 404 of amplifier transistor 118.

In addition to the features that have already been described, implementation 500 further shows additional features within inline amplifier stage 116 that have not yet been described. Specifically, in this example, inline amplifier stage 116 is shown to include a folded amplifier stage that is electrically connected to output voltage node 120 and is configured to increase an open-loop gain bandwidth of amplified output voltage 108-2 when received by load circuit 122. More particularly, in this particular example of implementation 500, the folded amplifier stage is implemented with a cascode circuit that includes 1) a voltage bias NMOS transistor 504 electrically connected between output voltage node 120 and biasing current source 114 (transistor 204), and 2) two voltage bias PMOS transistors 502-1 and 502-2 electrically connected between supply voltage 104 and output voltage node 120. In this way, the cascode circuit may balance the drive strength over output voltage node 120 by having two PMOS devices (PMOS transistors 502-1 and 502-2) between output voltage node 120 and supply voltage 104 and two NMOS devices (NMOS transistor 504 and the NMOS transistor 204 of biasing current source 114) between output voltage node 120 and ground. Collectively, these transistors may increase the open-loop gain bandwidth of amplified output voltage 108-2 at output voltage node 120 to ensure that, as amplified output voltage 108-2 settles at the node, load circuit 122 receives a stable and highly accurate voltage value. For example, this folded amplifier stage may operate by increasing an output impedance at output voltage node 120 and thereby increasing a direct current gain, increasing the bandwidth by reducing the miller capacitance, and so forth.

It is noted that, while inline amplifier stage 116 is still largely positioned inline between charge detection transistor 102 and biasing current source 114, the folded amplifier stage composed of the additional voltage bias transistors 502-1, 502-2, and 504 is positioned parallel to this branch, such that the bias current 106 drawn by biasing current source 114 in this implementation is slightly larger than the bias current 106 required in implementations described above. To illustrate, the depiction of bias current 106 in FIG. 5 is shown to include two current components 506-1 and 506-2. Current component 506-1 will be understood to be the current that flows through charge detection transistor 102 and amplifier transistor 118 to produce the amplified output voltage 108-2 on the output voltage node 120 in the ways that have been described. Current component 506-2 will then be understood to represent current flowing through the two voltage bias PMOS transistors 502-1 and 502-2 and voltage bias NMOS transistor 504 in the branch corresponding to the folded amplifier stage. While implementation 500 therefore uses at least some additional power as compared to an implementation that excludes the folded amplifier stage, it is noted that the total bias current 106 pulled through the circuit by biasing current source 114 in this example may still be far less than a conventional parallel amplifier would require, thus still providing significant power savings over conventional charge-to-voltage conversion circuit approaches.

FIG. 6 shows an example implementation 600 of charge-to-voltage conversion circuit 100. Implementation 600 continues to build on implementations 400 and 500, though, as mentioned above, it will be understood that the added features of implementation 600 serve an independent function from those added in implementations 400 and 500 and could be implemented separately from those prior features in certain implementations. In this particular example, implementation 600 is shown to include all the features of implementations 400 and 500, including current source 402 drawing a body bias current from body 404 of amplifier transistor 118, as well as including the folded amplifier stage with two voltage bias PMOS transistors 502-1 and 502-2 and voltage bias NMOS transistor 504.

In addition to the features that have already been described, implementation 600 further shows additional features within inline amplifier stage 116 that have not yet been described. Specifically, in this example, inline amplifier stage 116 is shown to include a correlated level shifting stage that is electrically connected to output voltage node 120 and is configured to decrease a settling time of amplified output voltage 108-2 when received by load circuit 122. More particularly, in this particular example of implementation 600, the correlated level shifting stage includes a capacitor 602 that dynamic switching causes to be: 1) electrically connected, during a pre-charge phase, in parallel with load circuit 122 by being connected between output voltage node 120 and a ground, and 2) electrically connected, during a level-shift phase, in series with load circuit 122 by being connected between output voltage node 120 and load circuit 122.

The different electrical connections associated with the different phases may be brought about in any manner as may serve a particular implementation. As one example, for instance, the correlated level shifting stage may include a plurality of switches configured to modify how capacitor 602 is electrically connected during the pre-charge phase and the level-shift phase, as well as digital logic configured to control the plurality of switches in accordance with a timing schedule for the pre-charge phase and the level-shift phase. While the digital logic and timing schedule is not explicitly shown in FIG. 6, a plurality of switches is shown with labels indicative of when (during which phases) the switches may be opened or closed. These phases and the timing schedule for the readout of one output voltage (one pixel for one image in an image capture example) will now be described in more detail with respect to the switches.

The timing schedule may begin with a reset phase referred to herein as Phase 1 and configured to allow bias voltages to settle after a reset. Switches in FIG. 6 that are labeled with a '1' (P1, P12) will be understood to be closed by the digital logic during this Phase 1 while the other switches are open. As such, implementation 600 shows that the gate of amplifier transistor 118 may be shorted with output voltage node 120 (shorting capacitor 201), while capacitor 602 may be connected to ground during this reset phase.

The timing schedule may continue with the pre-charge phase mentioned above, which will also be referred to herein as Phase 2. As one timing example, Phases 1 and 2 may combine to take approximately one microsecond in a particular implementation. In this pre-charge Phase 1, the parallel combination of load circuit 122 and capacitor 602 may be configured to charge so that amplified output voltage 108-2 may be settled on more quickly during the level-shift phase described below. To this end, switches in FIG. 6 that are labeled with a '2' (P12) will be understood to be closed by the digital logic during Phase 2 while the other switches are open. As such, implementation 600 shows that capacitor 602 is electrically connected in parallel with load circuit 122 during this pre-charge phase.

The timing schedule then finishes with the level-shift phase mentioned above, which will also be referred to herein as Phase 3. In the timing example mentioned above, Phase 3 may take approximately half the time of the combination of Phases 1 and 2, or about 500 nanoseconds in this example. In this level-shift Phase 3, capacitor 602 is shown to be placed in series with output voltage node 120 and load circuit 122 to create a level shift so that, as mentioned above, amplified output voltage 108-2 can settle more quickly. To this end, the switch in FIG. 6 that is labeled with a '3' (P3) will be understood to be closed by the digital logic during Phase 3 while the other switches are open. As such, implementation 600 shows that capacitor 602 is electrically connected in series with load circuit 122 during this level-shift phase.

The digital logic used to open and close the plurality of switches, as well as to manage the timing and transition from phase to phase, may be implemented using any suitable combinational logic, state machine logic, microcontroller, or other digital logic circuitry as may serve a particular implementation.

The level shift applied by the correlated level shifting stage illustrated in FIG. 6 may relax the performance requirements of the amplifier and increase output swing. For example, the level shift may effectively square the open-loop gain and allow for near rail-to-rail output swing in certain implementations. As has been described, the correlated level shifting stage may function by essentially allow the circuit to estimate the output (as part of the pre-charge Phase 2) before a final settling so that there is not as far to go to settle when the capacitor is put in series with the output (as part of level-shift Phase 3). Additionally, another potential advantage of including capacitor 602 in implementation 600 is that output voltage node 120 may be isolated through the capacitor, providing protection to the rest of the circuit if the voltage changes unexpectedly.

Figure 7:
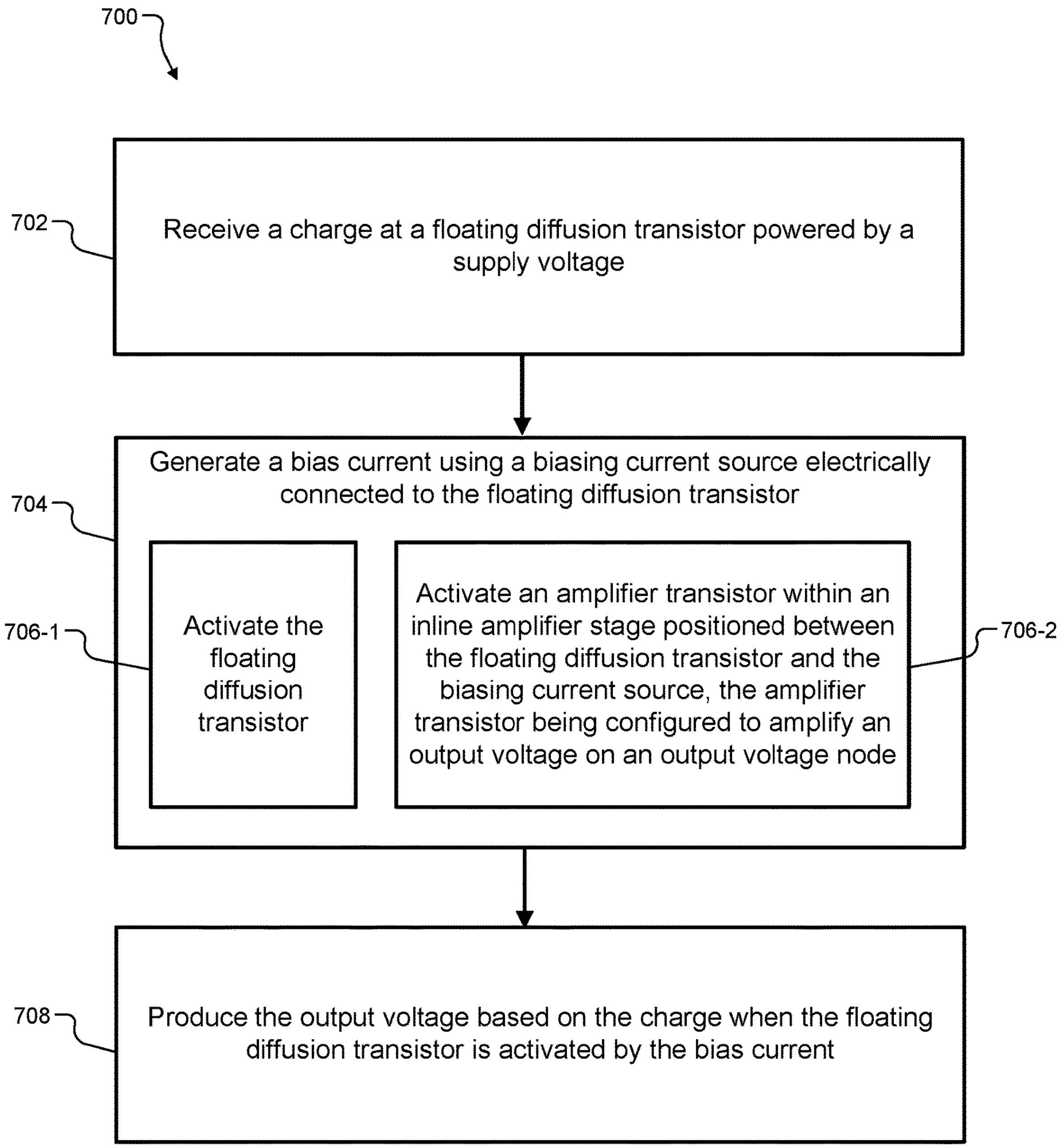
FIG. 7 shows an illustrative method related to charge-to-voltage conversion circuits in accordance with principles described herein.

FIG. 7 shows an illustrative method 700 related to charge-to-voltage conversion circuits in accordance with principles described herein. While FIG. 7 shows illustrative operations 702-706 according to one implementation, other implementations of method 700 may omit, add to, reorder, and/or modify any of the operations 702-706 shown in FIG. 7. In some examples, multiple operations shown in FIG. 7 or described in relation to FIG. 7 may be performed concurrently (e.g., in parallel) with one another, rather than being performed sequentially as illustrated and/or described. Each of operations 702-706 will now be described in more detail as the operations may be performed by an implementation of charge-to-voltage conversion circuit 100.

At operation 702, circuit 100 may receive a charge at a floating diffusion transistor. For example, the charge may be received at a gate of the floating diffusion transistor from a photodiode or other light detection element (an implementation of light detection element 302). The floating diffusion transistor may be implemented as any suitable transistor such as any implementation of the charge detection transistor 102 described above. The floating diffusion transistor may be powered by a supply voltage such as supply voltage 104, as further described and illustrated above.

At operation 704, circuit 100 may generate a bias current that activates the floating diffusion transistor. For example, the bias current may be generated by a biasing current source that is electrically connected to the floating diffusion transistor, such as the biasing current source 114 described and illustrated above. Operation 704 is shown to include two suboperations 706-1 and 706-2 that are performed as part of operation 704. Specifically, as shown, suboperations 706-1 and 706-2 represent the two things that the bias current generated at operation 704 may carry out. Suboperation 706-1 relates to the bias current activating the floating diffusion transistor. Suboperation 706-2 then relates to the bias current activating an amplifier transistor within an inline amplifier stage positioned between the floating diffusion transistor and the biasing current source. For example, an amplifier transistor such as the amplifier transistor 118 described and illustrated above may be configured to amplify an output voltage on an output voltage node when the amplifier transistor is activated by the bias current produced at operation 704.

At operation 708, circuit 100 may produce this output voltage based on the charge received at operation 702. In particular, the output voltage may be produced when the floating diffusion transistor is activated by a bias current such as bias current 106 described and illustrated above.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite illustrative relationships described in the specification or shown in the figures.

The various apparatus and techniques described herein may be implemented using various semiconductor processing and/or packaging techniques. Some embodiments may be implemented using various types of semiconductor processing technologies associated with semiconductor substrates including, but not limited to, for example, Silicon (Si), Galium Arsenide (GaAs), Silicon Carbide (SiC), and/or so forth.

It will also be understood that when an element, such as a layer, a region, or a substrate, is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element or layer, there are no intervening elements or layers present.

Although the terms directly on, directly connected to, or directly coupled to may not be used throughout the detailed description, elements that are shown as being directly on, directly connected or directly coupled can be referred to as such. The claims of the application may be amended to recite illustrative relationships described in the specification or shown in the figures.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

It will be understood that, although the terms first, second, etc. may be used herein to describe various elements, these elements should not be limited by these terms. These terms are only used to distinguish one element from another. A first element could be termed a second element, and, similarly, a second element could be termed a first element, without departing from the scope of the implementations of the disclosure. As used herein, the term and/or includes any and all combinations of one or more of the associated listed items.

While certain features of the described implementations have been illustrated as described herein, many modifications, substitutions, changes, and equivalents may occur to those skilled in the art. It is therefore to be understood that the appended claims are intended to cover such modifications and changes as fall within the scope of the implementations. It will be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components, and/or features of the different implementations described. As such, the scope of the present disclosure is not limited to the particular combinations hereafter claimed, but instead extends to encompass any combination of features or example implementations described herein irrespective of whether or not that particular combination has been specifically enumerated in the accompanying claims at this time.

What is claimed is:

1. A charge-to-voltage conversion circuit comprising:

a first transistor configured, when activated by a bias current, to produce an output voltage;

a biasing current source electrically connected to the first transistor and configured to generate the bias current to activate the first transistor; and an inline amplifier stage including a second transistor and a source electrically connected to the second transistor to draw current from the second transistor, the inline amplifier stage being positioned between the first transistor and the biasing current source and being configured to use the bias current generated by the biasing current source to activate the second transistor to amplify the output voltage.

2. The charge-to-voltage conversion circuit of claim 1, wherein the source is a body bias current source that draws current from a body of the second transistor.

3. The charge-to-voltage conversion circuit of claim 1, wherein the inline amplifier stage is configured to amplify the output voltage with a closed-loop gain using:

a first capacitor electrically connected between a gate of the second transistor and an output voltage node of the charge-to-voltage conversion circuit; and a second capacitor electrically connected between the gate of the second transistor and a ground.

4. The charge-to-voltage conversion circuit of claim 1, wherein:

an output voltage node is electrically connected to a load circuit; and the inline amplifier stage includes a folded amplifier stage electrically connected to the output voltage node and configured to increase an open-loop gain bandwidth of the amplified output voltage when received by the load circuit.

5. The charge-to-voltage conversion circuit of claim 4, wherein the folded amplifier stage is implemented with a cascode circuit including:

a voltage bias NMOS transistor electrically connected between the output voltage node and the biasing current source; and two voltage bias PMOS transistors electrically connected between the supply voltage and the output voltage node.

6. The charge-to-voltage conversion circuit of claim 1, wherein:

an output voltage node is electrically connected to a load circuit; and the inline amplifier stage includes a correlated level shifting stage electrically connected to the output voltage node and configured to decrease a settling time of the amplified output voltage when received by the load circuit.

7. The charge-to-voltage conversion circuit of claim 6, wherein the correlated level shifting stage includes a capacitor that is:

electrically connected, during a pre-charge phase, in parallel with the load circuit by being connected between the output voltage node and a ground; and electrically connected, during a level-shift phase, in series with the load circuit by being connected between the output voltage node and the load circuit.

8. The charge-to-voltage conversion circuit of claim 7, wherein the correlated level shifting stage further includes:

a plurality of switches configured to modify how the capacitor is electrically connected during the pre-charge phase and the level-shift phase; and digital logic configured to control the plurality of switches in accordance with a timing schedule for the pre-charge phase and the level-shift phase.

9. An active pixel sensor (APS) readout circuit comprising:

a floating diffusion transistor configured, when activated by a bias current, to produce an output voltage;

a biasing current source electrically connected to the floating diffusion transistor and configured to generate the bias current to activate the floating diffusion transistor;

a row select transistor configured, when enabled, to connect the output voltage onto a shared pixel readout node of the APS readout circuit; and an inline amplifier stage including an amplifier transistor and a source electrically connected to the amplifier transistor that draws current from the amplifier transistor, the inline amplifier stage is positioned between the floating diffusion transistor and the biasing current source, the inline amplifier stage configured to use the bias current generated by the biasing current source to activate the amplifier transistor within the inline amplifier stage to amplify the output voltage.

10. The APS readout circuit of claim 9, further includes an output voltage node, wherein:

an output voltage node is electrically connected to a load circuit; and the load circuit includes an analog-to-digital converter circuit that is configured to receive the amplified output voltage and to produce, based on the amplified output voltage, a digital value.

11. The APS readout circuit of claim 9, wherein the source is a body bias current source to draw current from a body of the amplifier transistor.

12. The APS readout circuit of claim 9, wherein the inline amplifier stage is configured to amplify the output voltage with a closed-loop gain using:

a first capacitor electrically connected between a gate of the amplifier transistor and an output voltage node of the APS readout circuit; and a second capacitor electrically connected between the gate of the amplifier transistor and a ground.

13. The APS readout circuit of claim 9, wherein:

the output voltage node is electrically connected to a load circuit; and the inline amplifier stage includes a folded amplifier stage electrically connected to the output voltage node and configured to increase an open-loop gain bandwidth of the amplified output voltage when received by the load circuit.

14. The APS readout circuit of claim 13, wherein the folded amplifier stage is implemented with a cascode circuit including:

a voltage bias NMOS transistor electrically connected between the output voltage node and the biasing current source; and two voltage bias PMOS transistors electrically connected between the supply voltage and the output voltage node.

15. The APS readout circuit of claim 9, wherein:

an output voltage node is electrically connected to a load circuit; and the inline amplifier stage includes a correlated level shifting stage electrically connected to the output voltage node and configured to decrease a settling time of the amplified output voltage when received by the load circuit.

16. The APS readout circuit of claim 15, wherein the correlated level shifting stage includes:

a capacitor that is:

electrically connected, during a pre-charge phase, in parallel with the load circuit by being connected between the output voltage node and a ground, and electrically connected, during a level-shift phase, in series with the load circuit by being connected between the output voltage node and the load circuit;

a plurality of switches configured to modify how the capacitor is electrically connected during the pre-charge phase and the level-shift phase; and digital logic configured to control the plurality of switches in accordance with a timing schedule for the pre-charge phase and the level-shift phase.

17. A method comprising:

receiving a charge at a floating diffusion transistor, the floating diffusion transistor powered by a supply voltage;

generating, by a biasing current source electrically connected to the floating diffusion transistor, a bias current to:

activate the floating diffusion transistor;

activate an amplifier transistor within an inline amplifier stage positioned between the floating diffusion transistor and the biasing current source, the amplifier transistor being configured to amplify an output voltage; and drawing current, using a source of the inline amplifier stage, from the amplifier transistor; and producing, by the floating diffusion transistor when activated by the bias current, the output voltage.

18. The method of claim 17, wherein the source is a body bias current source that draws current from a body of the amplifier transistor;

wherein the inline amplifier stage amplifies the output voltage with a closed-loop gain using:

a first capacitor electrically connected between a gate of the amplifier transistor and an output voltage node; and a second capacitor electrically connected between the gate of the amplifier transistor and a ground.

19. The method of claim 17, wherein:

an output voltage node is electrically connected to a load circuit; and the method further comprises increasing, by a folded amplifier stage electrically connected to the output voltage node within the inline amplifier stage, an open-loop gain bandwidth of the amplified output voltage when received by the load circuit.

20. The method of claim 17, wherein:

an output voltage node is electrically connected to a load circuit; and the method further comprises decreasing, by a correlated level shifting stage electrically connected to the output voltage node within the inline amplifier stage, a settling time of the amplified output voltage when received by the load circuit.

* * * * *